Patented May 5, 1931

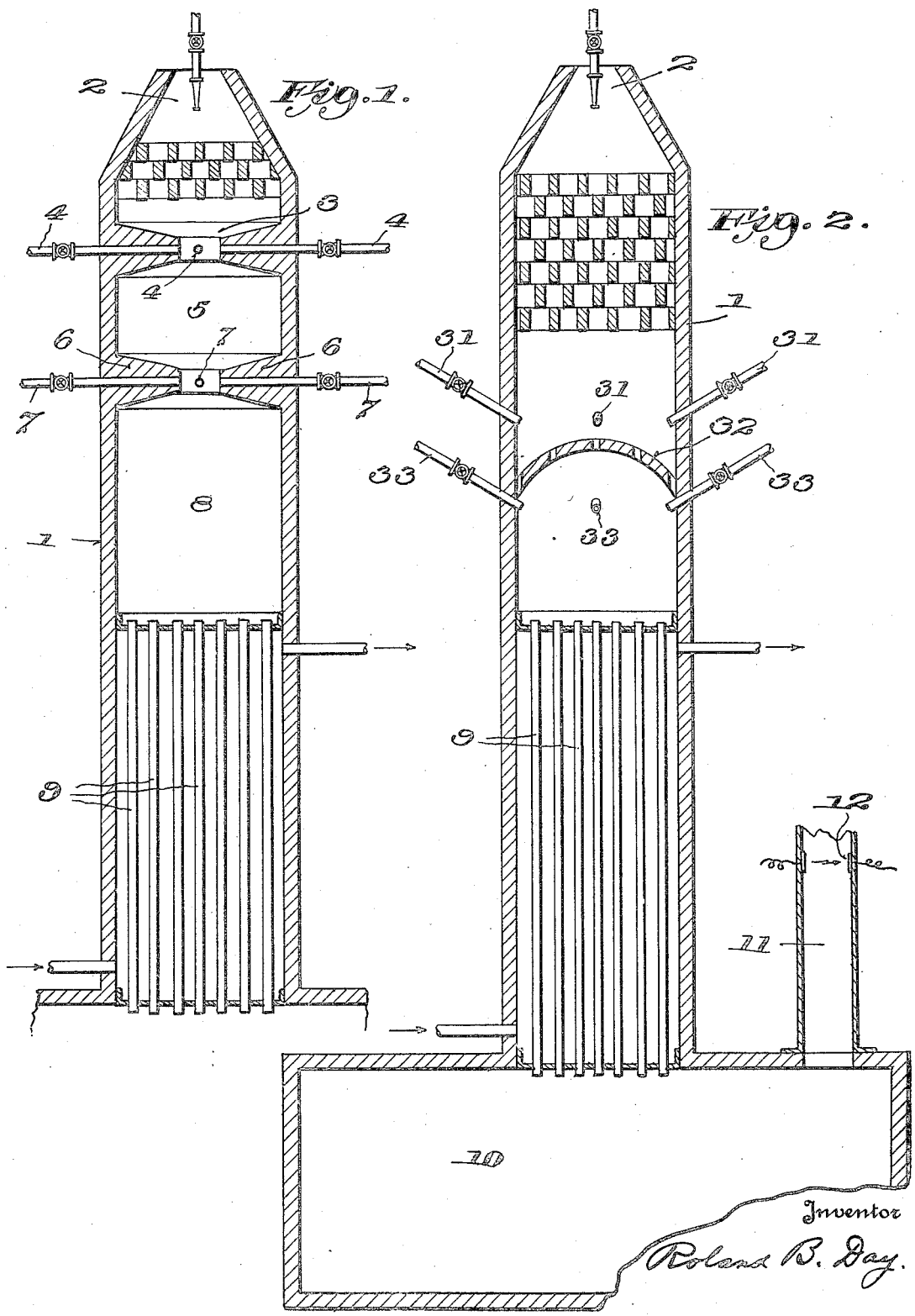

1,804,249

UNITED STATES PATENT OFFICE

ROLAND B. DAY, OF NEW YORK, N. Y.

PROCESS OF PRODUCING CARBON BLACK AND APPARATUS THEREFOR

Application filed December 21, 1926. Serial No. 156,167.

This invention relates to the production of carbon black or lampblack.

Particularly does this invention relate to improvements that result in greater efficiency of operation and in a product of high quality. It comprises especially what may be termed thermal decomposition of carbonaceous materials, as distinguished from their oxidation, and further comprises an improved manner and means of treating immediate products as they leave their zone of production. Carbonaceous materials include all such carbon-containing materials as mineral oils, pitches, and other hydrocarbons as well as intermediate products resulting from their destructive distillation.

Heretofore lampblack has been obtained by burning oil, or oil vapor, or combustible gas in an atmosphere restricted in oxygen. This is a very wasteful method. Also it has been proposed to decompose carbonaceous gases by heating them to a high temperature in an oxygen-poor atmosphere so as to yield free carbon and other products. But such proposals have been inferior in process and in product, due in part to hard or to oily carbon deposits on the surfaces either of the heater, or of the cooler, or elsewhere, with attendant undesirable results. In some of these methods such deposits of carbon on metallic surfaces have been intentional, in other, unintentional. Likewise it has been proposed to collect carbon black by precipitation of the same with water, following one or another mode of its production.

My invention is to be distinguished from these earlier efforts in that it does not contemplate the use of air or oxygen in contact with the material to be decomposed. It obtains the carbon by thermal decomposition, but does not employ externally heated apparatus. Further, the carbonaceous material is heated without its combustion, and out of contact with overheated surfaces. An important feature of my invention is that the products thus obtained are cooled as quickly as possible, yet without contact with any liquid or cooling vapor, and with as little contact as possible with any cooling surface.

In brief, I propose to decompose the carbonaceous material by mixing it intimately with hot gases and then to cause the products of this decomposition to flow at a regulable rate through heat absorption means to cool rapidly by radiation. The stream of cooled products then is caused to deposit suspended carbon, preferably by decrease in velocity.

In obtaining the intimate mixture of hot gases with the carbonaceous material, it is an essential feature of my process that there shall be temperature control. This temperature control is brought about by a regulated admixture of cooler gases free from oxygen with the hot gases prior to the admission of the carbonaceous material. This will provide an atmosphere substantially free from air or oxygen, and controllable in its available heat content.

The following description and accompanying drawings will illustrate diagrammatically specific embodiments of apparatus that I have invented for carrying out the preferred form of my process. Also my preferred process is described more in detail.

Fig. 1 is a vertical section of an insulated retort, 1, at an end of which, 2, hot gases are introduced or are generated and pass vertically downward. At a desirable distance within the retort, bodies are formed or inserted to obtain constricted passage, 3, for the hot gases. There may be one or more such constrictions and their extent or arrangement is not limited, but they exert a Venturi effect to form a zone of low pressure. Into this zone there discharge through valved conduits 4 cooling gases substantially free from oxygen which temper the hot gases and serve to form a cooler mixture substantially free from oxygen. The mixture thus obtained may become even more intimate in the cyclone space 5 following these constrictions. At a suitable distance beyond is another set of constricting means, 6, through which the carbonaceous material is introduced by valved conduits 7 into a low pressure zone of the hot gases. Following this is a reaction chamber 8.

Immediately decomposition of the carbonaceous material has occurred, it is desirable to cool the products as quickly as possible; at the same time it is desirable to recover their heat. Indirect heat interchange is therefore effected, preferably with a cooling fluid. To this purpose the exit end of the retort is provided with a nest of cooling tubes, 9, around which preferably water will be circulated.

This will result in a number of exit passages for the hot products. The advantage of this arrangement not only is to recover the heat in one or another usable form, but it serves to maintain the products at a high velocity. This keeps the lampblack in suspension rather than causing it to deposit on the walls of the cooler. It serves also to permit cooling of the products without their contamination.

Following this cooler the retort will terminate in a chamber, 10, of larger section to permit the settling and collection of the bulk of the lampblack. The gases will leave this chamber by a passage 11, in which a Cottrell or other precipitator 12 may be installed.

Fig. 2 shows a modified form of retort where the cold gas is introduced into hot gases simply through a battery of conduits 31 provided with regulating valves. This mixture then will enter the decomposition chamber through a perforated plate, 32. Immediately beyond this plate it will mix with streams of carbonaceous material introduced through a battery of conduits, 33. As before the reaction chamber is followed by the tubular cooling means, and the collection chamber of larger area. It is clear that various modifications will fall within the scope of my invention.

Preferably the hot gases will be furnished directly as gases of combustion, though they may comprise pre-heated gases in whole or in part. It is at the next step that I introduce an important feature of my invention—that the temperature of the gases is regulated by controlled admixture of (in one specific embodiment of this invention) relatively cooler gas substantially free from oxygen. This may be nitrogen, cooled products of combustion, carbon monoxide, etc. The result is a relatively large body of hot gases; by simple control its heat content is tempered to the requirements of the apparatus or of the material under use. But they should not be gases that result in combustion of the carbonaceous material.

An object preferably is that the temperature of this body of heating gas shall be uniform throughout; and also that then the admixture of the carbonaceous material shall be rapid and result in a uniform mixture with the decomposing gases.

My preferred carbonaceous material is natural gas, but clearly any carbonaceous gas, or finely divided liquid or even a fine suspension of solid would be within the scope of my invention. Using natural gas, I prefer a temperature of above 1500° F. However, the decomposition temperature for various materials is well known in the art.

It is important that cooling rapidly follow the decomposition, but at the same time that the carbon obtained shall not be contaminated nor deteriorated by the cooling means. Such result is obtained by my invention.

What I claim is:—

1. The method of producing carbon black which method comprises mixing hot gases of combustion with cooler gases free from oxygen to obtain a cooler mixture substantially free from oxygen, and then causing it to mix with carbonaceous particles at a temperature sufficiently high to yield carbon black but not sufficiently high to cause overheating of the carbon black when formed.

2. In a process of producing carbon black by thermal decomposition of carbonaceous material with hot gases free from oxygen, the step of regulating the temperature of a hot gas free from oxygen by admixture therewith of regulated quantities of a cooling gas.

3. In a process of producing carbon black by thermal decomposition of carbonaceous material with hot gases of combustion, the step of regulating the temperature of hot gas of combustion by induction of relatively cool inert gas in regulated quantities followed by introduction of carbonaceous material.

4. The process of producing carbon black from carbonaceous material which process comprises regulating the cooling of hot gases of combustion by mixture therewith in regulated quantities of another body of cooler gas of different thermal content substantially free from oxygen to produce a decomposition gas mixture substantially free from oxygen, then thermally decomposing the carbonaceous material by mixing it with the hot resultant decomposition gas mixture to obtain carbon black.

5. The process of producing carbon black which process comprises forming a body of hot gas free from oxygen through admixture in regulated quantities of two bodies of substantially inert gas of different thermal values, and then into said body injecting carbonaceous material to decompose the carbonaceous material and form carbon black.

6. In a process of obtaining carbon black by direct thermal decomposition of carbonaceous material with hot gases of combustion free from oxygen, the step of regulating the temperature of the hot gases of combustion by prior cooling of said hot gases of combustion through mixture therewith in regulated quantities of other cool gases free from oxygen.

7. The process of obtaining carbon black, which process comprises regulating the cooling of hot gases of combustion through mixture with cooler gas to obtain a gas mixture at temperature proper for effecting decomposition of carbonaceous material, but not high enough to allow overheating of the decomposed material, then into this medium diffusing carbonaceous material to effect the production of carbon black, and then cooling the products of decomposition by radiation while maintaining them in motion.

8. The process of obtaining carbon black, which process comprises induction of cooling gas into a stream of hot combustion gas to form a cooler mixture, then introducing carbonaceous material into the mixture to effect thermal decomposition of the carbonaceous material and production of carbon black, cooling the products of decomposition while maintaining the carbon black in suspension and causing the suspended particles to flow continuously in a stream at high velocity, then depositing the carbon black in an enlarged zone where the velocity of the particles is lower.

9. A retort for production of carbon black comprising means for obtaining hot gas substantially free from oxygen, a plurality of Venturi passages communicating in series and communicating also with said means to the first of said series of passages, the sides of said passages containing openings communicating with conduits, a reaction chamber communicating with said Venturi passages, a collection chamber, and narrow flues opening from said reaction chamber to said collection chamber, whereby a passageway is formed from said means through to said collection chamber.

10. In a process of producing carbon black by thermal decomposition of carbonaceous material with hot gas of combustion, the step of regulating the temperature of the gas of combustion by introduction of inert gas of different heat content in regulated quantities, followed by introduction of carbonaceous material.

11. A retort for production of carbon black comprising a gas generating zone, a series of narrow, communicating constricted passages, gas inlet means opening into each of said passages, an enlarged reaction chamber into which the lowermost passage opens, said gas generating zone forming with said restricted passages and said enlarged reaction chamber a passageway for the flow of gases, heat-absorbing means communicating with the lower end of said passageway, and narrow passages opening therethrough from said reaction chamber.

12. A process of obtaining carbon black by direct thermal decomposition of carbonaceous material, which comprises directing hot combustion gases downwardly in a vertical stream tempering the hot gases by adding to the stream at intermediate points thereof and in regulated quantities cooler gases substantially free from oxygen, to form a cooler oxygen free mixture, adding to the resulting mixture at lower points in the stream carbonaceous materials in regulated quantities to form a suspension of said carbonaceous materials undergoing conversion within the stream, and subsequently cooling the stream holding the suspension of materials undergoing conversion to precipitate carbon black therefrom.

13. A process of obtaining carbon black by direct thermal decomposition of carbonaceous material, which comprises directing hot combustion gases downwardly in a vertical stream, tempering the hot gases by adding to the stream at intermediate points thereof and in regulated quantities cooler gases substantially free from oxygen to form a cooler oxygen free mixture, adding to the resulting mixture at lower points in the stream carbonaceous materials in regulated quantities to form a suspension of said carbonaceous material undergoing conversion within the stream and subsequently cooling the stream holding the suspension of materials undergoing conversion to precipitate carbon black therefrom, by indirect heat interchange with a cooling fluid.

In testimony whereof I affix my signature.

ROLAND B. DAY.